(12) United States Patent
Jeong et al.

(10) Patent No.: US 9,548,482 B2
(45) Date of Patent: Jan. 17, 2017

(54) ELECTRODE ASSEMBLY HAVING SAFETY SEPARATOR AND SECONDARY BATTERY INCLUDING THE SAME

(71) Applicant: LG CHEM, LTD., Seoul (KR)

(72) Inventors: Yu Na Jeong, Daejeon (KR); Moon Young Jung, Daejeon (KR); Dong-Myung Kim, Daejeon (KR); Ki Tae Kim, Daejeon (KR); Sungwon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/105,948

(22) PCT Filed: Jan. 9, 2015

(86) PCT No.: PCT/KR2015/000224
§ 371 (c)(1),
(2) Date: Jun. 17, 2016

(87) PCT Pub. No.: WO2015/105369
PCT Pub. Date: Jul. 16, 2015

(65) Prior Publication Data
US 2016/0322618 A1  Nov. 3, 2016

(30) Foreign Application Priority Data

Jan. 10, 2014 (KR) ......................... 10-2014-0003110
Jan. 10, 2014 (KR) ......................... 10-2014-0003130
Jan. 10, 2014 (KR) ......................... 10-2014-0003157

(51) Int. Cl.
*H01M 2/14* (2006.01)
*H01M 10/04* (2006.01)
(Continued)

(52) U.S. Cl.
CPC ............. *H01M 2/14* (2013.01); *H01M 2/0285* (2013.01); *H01M 2/0287* (2013.01);
(Continued)

(58) Field of Classification Search
CPC .... H01M 2/14; H01M 2/0285; H01M 2/0287; H01M 4/485; H01M 4/5825; H01M 10/0525; H01M 10/058
See application file for complete search history.

(56) References Cited

U.S. PATENT DOCUMENTS 7,604,895 B2   10/2009  Kim et al.
2011/0236763 A1  9/2011  Noda et al.
(Continued)

FOREIGN PATENT DOCUMENTS

JP   2007-123156 A   5/2007
JP   2011-204378 A   10/2011
(Continued)

OTHER PUBLICATIONS

International Search Report for PCT/KR2015/000224(PCT/ISA/210) mailed on Apr. 17, 2015.

*Primary Examiner* — Basia Ridley
*Assistant Examiner* — Heng Chan
(74) *Attorney, Agent, or Firm* — Birch, Stewart, Kolasch & Birch, LLP (57) ABSTRACT

Disclosed herein is an electrode assembly configured to have a structure in which two or more unit cells are sequentially stacked or a structure in which two or more unit cells are folded using a long sheet type separation film, wherein the unit cells include bi-cells, each of which includes a positive electrode, a negative electrode, and a separator, at least one of the bi-cells includes a safety electrode configured such that an electrode active material is applied only to one major surface of an electrode current collector, the safety electrode includes a first surface, to which no electrode active material is applied, and a second surface, to which the electrode active material is applied, and the at least one of the bi-cells including the safety electrode is configured such that a safety separator, having a thickness equivalent to 110% to 220% of a thickness of a separator disposed between a positive electrode and a negative electrode or between a negative (Continued)

electrode and a positive electrode excluding the safety electrode, is added to the first surface and/or the second surface of the safety electrode.

24 Claims, 8 Drawing Sheets

(51) Int. Cl.
    *H01M 2/02*         (2006.01)
    *H01M 4/485*       (2010.01)
    *H01M 4/58*         (2010.01)
    *H01M 10/0525*    (2010.01)
    *H01M 10/058*     (2010.01)

(52) U.S. Cl.
    CPC ......... *H01M 4/485* (2013.01); *H01M 4/5825* (2013.01); *H01M 10/04* (2013.01); *H01M 10/058* (2013.01); *H01M 10/0525* (2013.01); *H01M 2200/00* (2013.01)

(56) References Cited

U.S. PATENT DOCUMENTS

| | | |
|---|---|---|
| 2012/0015244 A1 | 1/2012 | Kim et al. |
| 2014/0377631 A1 | 12/2014 | Park et al. |

FOREIGN PATENT DOCUMENTS

| | | |
|---|---|---|
| KR | 10-2005-0095956 A | 10/2005 |
| KR | 10-2008-0006819 A | 1/2008 |
| KR | 10-2012-0008343 A | 1/2012 |
| KR | 10-2013-0131246 A | 12/2013 |

ELECTRODE ASSEMBLY HAVING SAFETY SEPARATOR AND SECONDARY BATTERY INCLUDING THE SAME

TECHNICAL FIELD

The present invention relates to an electrode assembly having a safety separator and a secondary battery including the same.

BACKGROUND ART

As mobile devices have been increasingly developed, and the demand for such mobile devices has increased, the demand for secondary batteries has also sharply increased as an energy source for the mobile devices. Accordingly, much research into batteries satisfying various needs has been carried out.

Secondary batteries may be classified based on the shape of a battery case of each of the secondary batteries into a cylindrical battery configured to have a structure in which an electrode assembly is mounted in a cylindrical metal container, a prismatic battery configured to have a structure in which an electrode assembly is mounted in a prismatic metal container, and a pouch-shaped battery configured to have a structure in which an electrode assembly is mounted in a pouch-shaped case made of a laminated aluminum sheet.

In addition, secondary batteries may be classified based on the structure of an electrode assembly including a positive electrode, a negative electrode, and a separator. For example, the electrode assembly may be configured to have a jelly-roll (wound) type structure in which long-sheet type positive electrodes and negative electrodes are wound while separators are disposed respectively between the positive electrodes and the negative electrodes, a stacked type structure in which pluralities of positive electrodes and negative electrodes, each having a predetermined size, are sequentially stacked while separators are disposed respectively between the positive electrodes and the negative electrodes, a stacked/folded type structure in which pluralities of positive electrodes and negative electrodes, each having a predetermined size, are sequentially stacked while separators are disposed respectively between the positive electrodes and the negative electrodes to constitute a unit cell, such as a bi-cell or a full cell, and then unit cells are wound in a state in which the unit cells are disposed on a separation film, or another stacked type electrode assembly in which bi-cells or full cells are stacked in a state in which separators are disposed respectively between the bi-cells or the full cells.

In recent years, a lot of interest has been directed to a secondary battery including an electrode assembly that includes bi-cells or full cells, which are easy to manufacture, manufacturing cost of which is low, and which have high structural applicability in response to various shapes of a device, in which the secondary battery is mounted.

Meanwhile, in a case in which a sharp needle-shaped conductor, such as a nail, having high electrical conductivity penetrates into the electrode assembly, the positive electrode and the negative electrode of the electrode assembly are electrically connected to each other by the needle-shaped conductor, with the result that current flows to the needle-shaped conductor, the resistance of which is low. At this time, the electrodes through which the needle-shaped conductor has penetrated are deformed, and high resistance heat is generated due to conducting current in a contact resistance portion between a positive electrode active material and a negative electrode active material. In a case in which the temperature in the electrode assembly exceeds a critical temperature level due to the resistance heat, the oxide structure of the positive electrode active material collapses, and therefore a thermal runaway phenomenon occurs. As a result, the electrode assembly and the secondary battery may catch fire or explode.

In addition, in a case in which the electrode active material or a current collector bent by the needle-shaped conductor contacts the opposite electrode that the electrode active material or the current collector faces, the thermal runaway phenomenon may be further accelerated. These problems may be more serious in a bi-cell including a plurality of electrodes and an electrode assembly including the same.

DISCLOSURE

Technical Problem

Therefore, the present invention has been made to solve the above problems, and other technical problems that have yet to be resolved.

As a result of a variety of extensive and intensive studies and experiments to solve the problems as described above, the inventors of the present application have found that, in a case in which a safety separator exhibiting high elongation and having a large thickness is used, it is possible to fundamentally solve conventional problems. The present invention has been completed based on these findings.

Technical Solution

In accordance with one aspect of the present invention, the above and other objects can be accomplished by the provision of an electrode assembly configured to have a structure in which two or more unit cells are sequentially stacked or a structure in which two or more unit cells are folded using a long sheet type separation film, wherein the unit cells include bi-cells, each of which includes a positive electrode, a negative electrode, and a separator, at least one of the bi-cells includes a safety electrode configured such that an electrode active material is applied only to one major surface of an electrode current collector, the safety electrode includes a first surface, to which no electrode active material is applied, and a second surface, to which the electrode active material is applied, and the at least one of the bi-cells including the safety electrode is configured such that a safety separator, having a thickness equivalent to 110% to 220% of a thickness of a separator disposed between a positive electrode and a negative electrode or between a negative electrode and a positive electrode excluding the safety electrode, is added to the first surface and/or the second surface of the safety electrode.

That is, the electrode assembly according to the present invention is configured to have a structure in which, in a case in which a needle-shaped conductor penetrates into the electrode assembly, the safety separator of the safety electrode is elongated by friction force between the needle-shaped conductor and the safety separator, whereby it is possible to minimize contact between the needle-shaped conductor and electrodes of the electrode assembly, with the result that it is possible to prevent an excessive amount of current from flowing to the needle-shaped conductor.

In addition, the safety separator has a relatively large thickness. In a case in which a heavy object pushes the electrode assembly or strong impact is applied to the electrode assembly, therefore, it is possible for the safety separator to absorb such shocks, thereby further improving the safety of the electrode assembly against external force.

Consequently, the safety electrode may be an electrode disposed on at least one outermost side of the electrode assembly, which has low resistance to a needle-shaped conductor or external force. The at least one outermost side of the electrode assembly may be the uppermost end and/or the lowermost end of the electrode assembly.

The safety separator added to the second surface may have a thickness of 15 to 30 micrometers. Specifically, the safety separator added to the second surface may have a thickness of 20 micrometers, which is the optimal thickness that is necessary to increase the elongation of the safety separator and to minimize the increase in volume of the electrode assembly. In a case in which the thickness of the safety separator is less than 15 micrometers, the safety separator may not be sufficiently elongated when a needle-shaped conductor penetrates into the electrode assembly, which is not preferable. In a case in which the thickness of the safety separator is greater than 30 micrometers, on the other hand, the volume of the electrode assembly may be increased. In consideration of the fact that the specification (dimensions) of a battery cell including the electrode assembly is limited, the content and loading amount of the electrode active material must be reduced as the thickness of the safety separator is increased. As a result, it is not possible to manufacture an electrode assembly having high capacity.

Meanwhile, the safety separator added to the first surface is substantially located on at least one outermost side of the electrode assembly. The safety separator may serve to absorb external force applied to the at least one outermost side of the electrode assembly. The safety separator may have a thickness such that the safety separator can be elongated when the needle-shaped conductor penetrates into the electrode assembly. Specifically, the safety separator added to the first surface may have a thickness equivalent to 80 to 100% of the thickness of the safety separator added to the second surface.

However, in a case in which both the safety separator added to the first surface and the safety separator added to the second surface are added to the safety electrode, the safety separator added to the second surface may also be elongated by the needle-shaped conductor, whereby it is possible to minimize contact between the needle-shaped conductor and electrodes of the electrode assembly. For this reason, the thickness of the safety separator added to the first surface may be set such that the safety separator added to the first surface is elongated by the needle-shaped conductor in order to surround only the electrode current collector and the electrode active material layer of the safety electrode. More specifically, the safety separator added to the first surface may have a thickness equivalent to 90 to 95% of the thickness of the safety separator added to the second surface.

That is, in the above case, the thickness of the safety separator added to the first surface is an optimal thickness, at which the effect obtained by the safety separator added to the first surface does not conflict with the effect obtained by the safety separator added to the second surface while it is possible for the safety separator added to the first surface to protect the electrode current collector and the electrode active material layer of the safety electrode. The inventors of the present application have found that the safety separator added to the first surface while having a thickness within the above-specified range is elongated together with the current collector by the needle-shaped conductor in order to completely prevent contact between the current collector of the safety electrode and the needle-shaped conductor.

In order to reduce the volume of the electrode assembly, the separator may have a thickness less than that of the safety separator. Specifically, the separator may have a thickness of 10 to 14 micrometers. In a case in which the thickness of the separator is less than 10 micrometers, the mechanical strength of the separator is low, with the result that the separator may be ruptured when the electrode assembly shrinks or expands. In a case in which the thickness of the separator is greater than 14 micrometers, on the other hand, the volume of the electrode assembly may be increased, which is not preferable.

In a concrete example, the bi-cells may include first bi-cells disposed at the outermost sides of the electrode assembly and second bi-cells disposed between the first bi-cells. The first bi-cells and the second bi-cells may have the same structure and/or different structures.

Specifically, each of the first bi-cells may be configured to have a structure in which a safety separator, a safety electrode, a separator, a double-sided electrode, a separator, and a double-sided electrode are sequentially stacked. In this structure, the safety separator is located at one of the outermost sides of each of the first bi-cells. Consequently, it is possible to easily absorb shocks. In addition, the safety separator is elongated while being penetrated first by the needle-shaped conductor when the needle-shaped conductor penetrates into the electrode assembly, with the result that it is possible to prevent the occurrence of a short circuit in the safety electrode.

Alternatively, each of the first bi-cells may be configured to have a structure in which a safety separator, a safety electrode, a safety separator, a double-sided electrode, a separator, and a double-sided electrode are sequentially stacked. In this structure, it is possible for the safety separator to efficiently prevent contact between the safety electrode and the double-sided electrode facing the safety electrode when needle-shaped conductor penetrates into the electrode assembly.

In addition, two safety separators may be added to the first surface and the second surface of the safety electrode. Specifically, each of the first bi-cells may be configured to have a structure in which a safety electrode, a safety separator, a double-sided electrode, a separator, and a double-sided electrode are sequentially stacked. This structure has all advantages of the above-described safety separator. Each of the safety separators may have a small thickness in order to minimize the increase in volume of the electrode assembly.

In a case in which the second bi-cell is configured to have a structure different from that of each of the first bi-cells, the second bi-cell may be configured to have a structure in which a double-sided electrode, a separator, a double-sided electrode, a separator, and a double-sided electrode are sequentially stacked.

In this specification, electrodes may refer to both a positive electrode configured such that a positive electrode active material is applied to a current collector and a negative electrode configured such that a negative electrode active material is applied to a current collector. The double-sided electrode may be an electrode configured such that an electrode active material, such as a negative electrode active material or a positive electrode active material, is applied to opposite major surfaces of a current collector.

That is, each of the first bi-cells may be configured to have a structure in which a positive electrode as a safety electrode, a separator, a double-sided negative electrode, a separator, and a double-sided positive electrode are sequentially stacked. Alternatively, each of the first bi-cells may be configured to have a structure in which a negative electrode as a safety electrode, a separator, a double-sided positive electrode, a separator, and a double-sided negative electrode are sequentially stacked.

In addition, the second bi-cell may be configured to have a structure in which a double-sided positive electrode, a separator, a double-sided negative electrode, a separator, and a double-sided positive electrode are sequentially stacked. Alternatively, the second bi-cell may be configured to have a structure in which a double-sided negative electrode, a separator, a double-sided positive electrode, a separator, and a double-sided negative electrode are sequentially stacked.

Meanwhile, the first bi-cells and the second bi-cell may be unit cells that are capable of generating electric power. The first bi-cells and the second bi-cell may be variously combined to constitute the electrode assembly.

In a first example of the electrode assembly, the electrode assembly may be configured to have a stacked/folded structure in which a long sheet type separation film is wound in a state in which the first bi-cells and the second bi-cell are arranged on the separation film such that the first bi-cells and the second bi-cell are stacked in a state in which the separation film is disposed between the first bi-cells and the second bi-cell. The stacked/folded structure has an advantage in that a process of manufacturing the electrode assembly is automated.

In another example of the electrode assembly, the electrode assembly may be configured to have a stacked/laminated structure in which, in a state in which separators, each having an adhesive, such as PVDF, applied thereto, are disposed between the first bi-cells and the second bi-cell, the first bi-cells and the second bi-cell are bonded to each other by thermal bonding in a state in which the first bi-cells and the second bi-cell are stacked. The stacked/laminated structure has an advantage in that no separation film is provided, whereby the volume of the electrode assembly is not increased.

In a concrete example, the safety electrode of the first bi-cell, located at each outermost side of the electrode assembly, may be located at each outermost side of the electrode assembly, and the safety separator of the safety electrode may be located at each outermost side of the electrode assembly.

In the above structure, it is possible for the safety separator included in the safety electrode to reduce the magnitude of external force that is applied to the outer surface of the electrode assembly and to fundamentally prevent contact between a current collector of the safety electrode and a needle-shaped conductor, contact between the safety electrode and a double-sided electrode having a polarity opposite to that of the safety electrode, or contact between the needle-shaped conductor and electrodes of the electrode assembly.

Specifically, the safety separator is curved in the direction in which the safety separator is penetrated due to downward force of the needle-shaped conductor when the needle-shaped conductor penetrates into the electrode assembly, and is elongated by frictional force between the safety separator and the needle-shaped conductor. As a result, the safety separator surrounds the active material layer and the current collector of the safety electrode, whereby it is possible for the safety separator to prevent contact between the needle-shaped conductor and the safety electrode. In addition, the safety separator surrounds the penetrated sections of the electrodes, whereby it is possible for the safety separator to prevent the occurrence of a short circuit due to contact between the needle-shaped conductor and electrodes.

Meanwhile, in a concrete example, the separator and the safety separator each may be an organic/inorganic composite porous safety-reinforcing separator (SRS).

The SRS separator does not thermally shrink at high temperature due to heat resistance of the inorganic particles. Even when the needle-shaped conductor penetrates into the electrode assembly, therefore, the elongation of the safety separator may be maintained.

The SRS separator may be configured such that an active layer, including inorganic particles and a binder polymer, is coated on a polyolefin-based separator substrate.

The SRS separator may have a pore structure included in the separator substrate and a uniform pore structure formed by the interstitial volume among inorganic particles as active layer ingredients. The pores may considerably reduce the magnitude of external impact applied to the electrode assembly. In addition, lithium ions may smoothly flow through the pores, and the pores may be filled with a large amount of electrolyte in order to increase an impregnation rate, thereby improving the performance of the battery.

The pores formed in the polyolefin-based separator substrate and the active layer may exist in an anchoring state such that the separator substrate and the active layer are physically coupled to each other. In consideration of physical coupling force between the separator substrate and the active layer and the pore structure in the separator, a thickness ratio of the separator substrate to the active layer may be 9:1 to 1:9. Specifically, the thickness ratio of the separator substrate to the active layer may be 5:5.

In the SRS separator, one of the active layer ingredients formed in some pores of a surface and/or a substrate of the polyolefin-based separator substrate is inorganic particles which are conventionally known in the art.

The inorganic particles may form empty space among inorganic particles and thereby may form micro pores and maintain a physical shape as a spacer. In addition, physical characteristics of the inorganic particles are not generally changed at a temperature of 200° C. or more and, as such, a formed organic/inorganic composite porous film has excellent thermal resistance.

The inorganic particles are not particularly restricted so long as the inorganic particles are electrochemically stable. That is, the inorganic particles that can be used in the present invention are not particularly restricted so long as the inorganic particles are not oxidized and/or reduced within an operating voltage range (e.g. 0 to 5 V based on Li/Li+) of a battery to which inorganic particles are applied. In particular, in a case in which inorganic particles having ion transfer ability are used, it is possible to improve ion conductivity in an electrochemical element, thereby improving the performance of the battery. Consequently, it is preferable that ion conductivity of the inorganic particles be as high as possible. In addition, in a case in which the inorganic particles have high density, it may be difficult to disperse the inorganic particles at the time of coating, and the weight of the battery may increase. For these reasons, it is preferable that density of the inorganic particles be as low as possible. Additionally, in a case in which the inorganic particles have high permittivity, a degree of dissociation of electrolyte salt, such as lithium salt, in a liquid electrolyte may increase, thereby improving ion conductivity of the electrolytic solution.

Due to the reasons described above, the inorganic particles may be one or more kinds of inorganic particles selected from a group consisting of (a) inorganic particles having piezoelectricity and (b) inorganic particles having lithium ion transfer ability.

The inorganic particles having piezoelectricity mean a material which is a nonconductor at normal pressure but, when a certain pressure is applied thereto, an internal structure is changed and thereby has conductivity. In particular, the inorganic particles having piezoelectricity exhibit high dielectric constant characteristics having a dielectric constant of 100 or more and have a potential difference between both faces in which one face is charged by a positive electrode and the other face is charged by a negative electrode by electric charges generated when the inorganic particles are tensioned or compressed by a certain pressure.

In a case in which the inorganic particles having the above-mentioned characteristics are used as a porous active layer ingredient, a short-circuit may occur in the positive electrode and the negative electrode due to external impact, such as a needle-shaped conductor, whereby positive electrode and the negative electrode may not directly contact each other due to inorganic particles coated on a separator, and potential differences in particles may occur due to piezoelectricity of the inorganic particles. Accordingly, electron migration, namely, fine current flow, is achieved between both electrodes, whereby voltage of the battery is gradually reduced, and therefore stability may be improved.

The inorganic particles having piezoelectricity may be one or more kinds of inorganic particles selected from a group consisting of $BaTiO_3$, $Pb(Zr,Ti)O_3$ (PZT), $Pb_{1-x}La_xZr_{1-y}Ti_yO_3$ (PLZT), $Pb(Mg_3Nb_{2/3})O_3$—$PbTiO_3$ (PMN-PT), and hafnia ($HfO_2$), but the present invention is not limited thereto.

The inorganic particles having lithium ion transfer ability indicate inorganic particles which contain lithium elements, do not save lithium, and transport lithium ions. The inorganic particles having lithium ion transfer ability may transfer and transport lithium ions by a defect present in a particle structure. Consequently, lithium ionic conductivity in a battery is improved, and therefore battery performance may be improved.

The inorganic particles having lithium ion transfer ability may be one or more kinds of inorganic particles selected from a group consisting of lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $(LiAlTiP)_xO_y$-based glass (where $0<x<4$ and $0<y<13$), lithium lanthanum titanate ($Li_xTa_yTiO_3$, where $0<x<2$ and $0<y<3$), lithium germanium thio phosphate ($Li_xGe_yP_zS_w$, where $0<x<4$, $0<y<1$, $0<z<1$, and $0<w<5$), lithium nitride ($Li_xN_y$, where $0<x<4$ and $0<y<2$), $SiS_2$-based glass ($Li_xSi_yS_z$, where $0<x<3$, $0<y<2$, and $0<z<4$), and $P_2S_5$-based glass ($Li_xP_yS_z$, where $0<x<3$, $0<y<3$, and $0<z<7$), but the present invention is not limited thereto.

A composition ratio of the inorganic particles and the binder polymer, which constitute the active layer ingredient, is not greatly limited and may be controlled in a range of 10:90 to 99:1 wt %, preferably 80:20 to 99:1 wt %. In a case in which the composition ratio is less than 10:90 wt %, the amount of polymer is excessively increased and thereby pore sizes and porosity are reduced due to reduction of interstitial volume formed among inorganic particles, and, accordingly, final battery performance is deteriorated. On the contrary, in a case in which the composition ratio exceeds 99:1 wt %, the amount of a polymer is too low and thereby adhesive strength among inorganic matters is weakened, and, accordingly, the mechanical properties of a final organic/inorganic composite porous separator may be deteriorated.

The active layer of the organic/inorganic composite porous separator may include other conventionally known additives, in addition to the inorganic particles and the polymer described above.

In the organic/inorganic composite porous separator, the substrate coated with the mixture of the inorganic particles and the binder polymer as ingredients of the active layer may be, for example, a polyolefin-based separator conventionally used in the art. The polyolefin-based separator ingredient may be, for example, high-density polyethylene, linear low-density polyethylene, low-density polyethylene, ultra-high molecular weight polyethylene, polypropylene, derivatives thereof, or the like.

Hereinafter, other components of the electrode assembly according to the present invention will be described.

The positive electrode may be manufactured, for example, by applying a mixture of a positive electrode active material, a conductive agent, and a binder to a positive electrode current collector and drying the applied mixture. A filler may be further added to the mixture as needed.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

In general, the positive electrode current collector has a thickness of 3 to 500 μm.

The positive electrode current collector is not particularly restricted so long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. Specifically, the positive electrode current collector may be made of aluminum. The positive electrode current collector may have a micro-scale uneven pattern formed at the surface thereof so as to increase the adhesive force of the positive electrode active material. The positive electrode current collector may be configured in various forms, such as a film, a sheet, a foil, a net, a porous body, a foam body, and a non-woven fabric body.

The conductive agent is generally added so that the conductive agent has 1 to 50 weight % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 50 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as the filler does not cause chemical changes in a battery to which the filler is applied, and is made of a fibrous material. As examples of the filler, there may be used olefin polymers, such as polyethylene and polypropylene; and fibrous materials, such as glass fiber and carbon fiber.

The negative electrode is prepared by applying, drying, and pressing a negative electrode active material to a negative electrode current collector. The above-described conductive agent, the binder, and the filler may be selectively added to the negative electrode active material as needed.

As the negative electrode active material, for example, there may be used carbon, such as non-graphitizing carbon or a graphite-based carbon; a metal composite oxide, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \le x \le 1$; $1 \le y \le 3$; $1 \le z \le 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

In general, the negative electrode current collector has a thickness of 3 to 500 μm.

The negative electrode current collector is not particularly restricted so long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In the same manner as in the positive electrode current collector, the negative electrode current collector may have a micro-scale uneven pattern formed at the surface thereof so as to increase adhesive force of the negative electrode active material. The negative electrode current collector may be configured in various forms, such as a film, a sheet, a foil, a net, a porous body, a foam body, and a non-woven fabric body.

In accordance with another aspect of the present invention, there is provided a secondary battery having the electrode assembly with the above-stated construction mounted in a battery case.

The battery case may be a pouch-shaped case made of an aluminum laminate sheet or a metal can-shaped case, but the present invention is not limited thereto.

The secondary battery may be a lithium secondary battery including an electrode assembly and a non-aqueous electrolyte containing lithium salt.

The non-aqueous electrolyte containing lithium salt is composed of a non-aqueous electrolyte and lithium salt. A non-aqueous organic solvent, an organic solid electrolyte, or an inorganic solid electrolyte may be used as the non-aqueous electrolyte. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature storage characteristics, the non-aqueous electrolytic solution may further include carbon dioxide gas. In addition, fluoro-ethylene carbonate (FEC) and propene sultone (PRS) may be further included.

In a preferred example, lithium salt, such as $LiPF_6$, $LiClO_4$, $LiBF_4$, or $LiN(SO_2CF_3)_2$, may be added to a mixed solvent of cyclic carbonate, such as EC or PC, which is a high dielectric solvent, and liner carbonate, such as DEC, DMC, or EMC, which is a low viscosity solvent, to prepare a non-aqueous electrolyte containing lithium salt.

In accordance with other aspects of the present invention, there are a battery pack including the secondary battery with the above-stated construction as a unit battery and a device including the battery pack as a power source.

The device may be selected from among a mobile phone, a portable computer, a smartphone, a smart pad, a tablet PC, and a netbook computer. However, the present invention is not limited thereto.

Those skilled in the art will appreciate that various applications and modifications are possible within the category of the present invention based on the above description.

DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
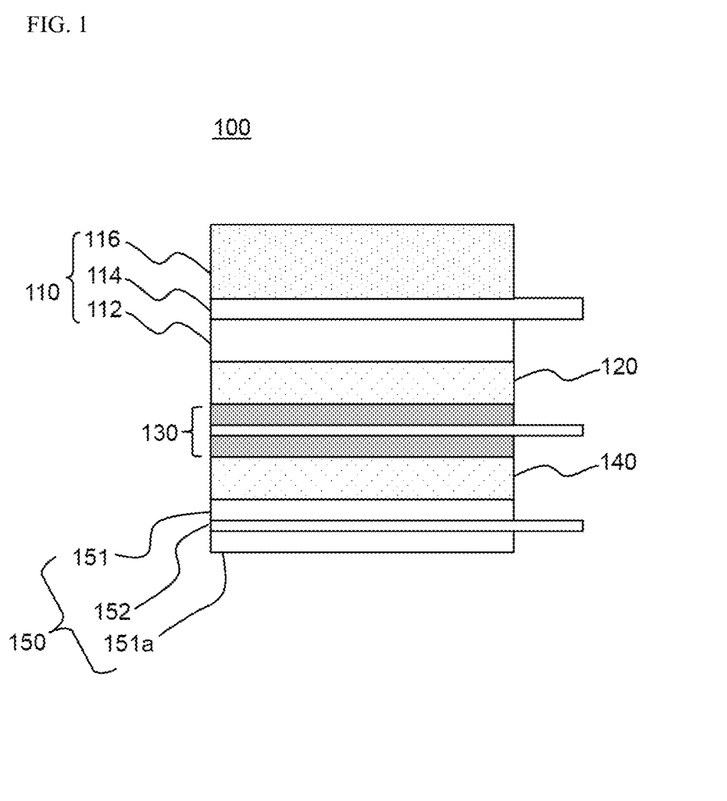
FIG. 1 is a vertical sectional view showing a first bi-cell according to an embodiment of the present invention.
Figure 2:
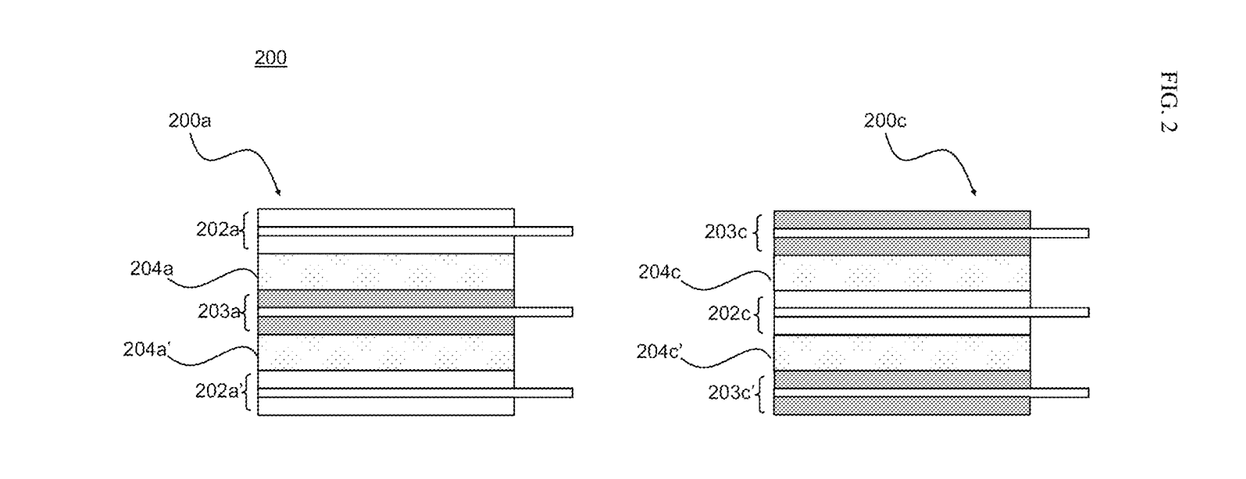
FIG. 2 is a vertical sectional view showing a second bi-cell according to an embodiment of the present invention.

FIG. 1 is a vertical sectional view showing a first bi-cell according to an embodiment of the present invention, and FIG. 2 is a vertical sectional view showing a second bi-cell according to an embodiment of the present invention.

In the following description, for the convenience of description, a positive electrode is used as a safety electrode, and a unit cell configured to have a structure in which a safety separator, a safety electrode, a separator, a negative electrode, a separator, and a positive electrode are sequentially stacked is used as a first bi-cell. However, the present invention is not limited thereto.

Referring first to FIG. 1, a first bi-cell 100 is configured to have a structure in which a safety separator 116, a safety electrode 110, a separator 120, a double-sided negative electrode 130, a separator 140, and a double-sided positive electrode 150 are sequentially stacked.

The safety electrode 110 is a single-sided electrode configured such that a positive electrode active material layer 112 is applied only to one major surface of a metal current collector 114 facing the double-sided negative electrode 130. One major surface of the safety electrode 110 to which the positive electrode active material layer 112 is applied may be a second surface, and the other major surface of the safety electrode 110 to which no positive electrode active material layer 112 is applied may be a first surface. The safety separator 116 is located on the first surface of the safety electrode 110.

The double-sided positive electrode 150 is configured to have a structure in which positive electrode active materials 151 and 151a are applied to opposite major surfaces of a current collector 152. In the same manner, the double-sided negative electrode 130 is configured to have a structure in which negative electrode active materials are applied to opposite major surfaces of a current collector.

The safety separator 116 has a thickness about 1.5 to 1.7 times greater than the thickness of each of the separators 120 and 140 such that the safety separator 116 can be sufficiently elongated when a needle-shaped conductor penetrates into the first bi-cell 100. The separators 120 and 140 and the safety separator 116 each may be an organic/inorganic composite porous safety-reinforcing separator (SRS).

Meanwhile, a second bi-cell 200 shown in FIG. 2 may be configured to have two unit structures in which the same electrodes are located at the opposite sides of the cell. For example, the second bi-cell 200 may be configured to have a unit structure in which a positive electrode, a separator, a negative electrode, a separator, and a positive electrode and a unit structure in which a negative electrode, a separator, a positive electrode, a separator, and a negative electrode. In this specification, a bi-cell having a negative electrode located at the middle thereof is referred to as an A-type bi-cell 200a, and a bi-cell having a positive electrode located at the middle thereof is referred to as a C-type bi-cell 200c.

In a case in which the second bi-cell 200 is configured as the A-type bi-cell 200a, the second bi-cell 200 is configured to have a structure in which a double-sided positive electrode 202a, a separator 204a, a double-sided negative electrode 203a, a separator 204a', and a double-sided positive electrode 202a' are sequentially stacked. In a case in which the second bi-cell 200 is configured as the C-type bi-cell 200c, the second bi-cell 200 is configured to have a structure in which a double-sided negative electrode 203c, a separator 204c, a double-sided positive electrode 202c, a separator 204c', and a double-sided negative electrode 203c' are sequentially stacked.

That is, the second bi-cell 200 is different from the first bi-cell 100 in that the safety electrode 110, to which the safety separator 116 is added and which is configured such that the electrode active material is applied only to one major surface of the electrode current collector, is not included and in that the SRS separators, which are thin, are used to minimize the volume of the electrode assembly.

Figure 3:
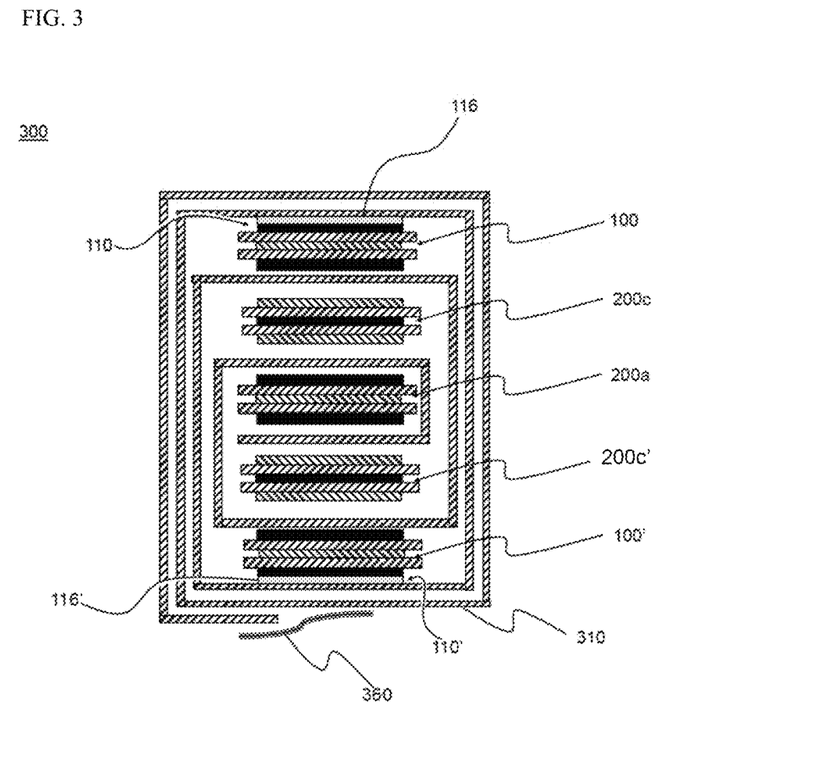
FIG. 3 is a typical view showing an electrode assembly according to an embodiment of the present invention.
Figure 4:
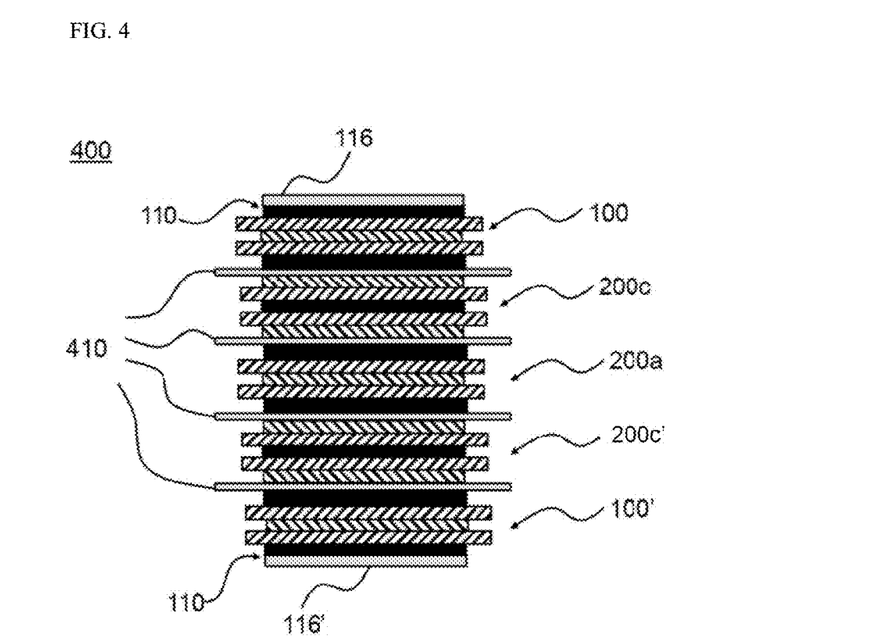
FIG. 4 is a typical view showing an electrode assembly according to another embodiment of the present invention.

Meanwhile, FIG. 3 is a typical view showing a stacked/folded electrode assembly including first bi-cells and second bi-cells which are shown in FIGS. 1 and 2, and FIG. 4 is a typical view showing a stacked/laminated electrode assembly including first bi-cells and second bi-cells which are shown in FIGS. 1 and 2.

Referring first to FIG. 3 together with FIGS. 1 and 2, an electrode assembly 300 is configured to have a structure in which first bi-cells 100 and 100' and second bi-cells 200c, 200c', and 200a are folded in a state in which the first bi-cells 100 and 100' and the second bi-cells 200c, 200c', and 200a are arranged on a separation film 310 such that the first bi-cells 100 and 100' and the second bi-cells 200c, 200c', and 200a are stacked.

The first bi-cells 100 and 100' are located at the upper end and lower end of the electrode assembly 300, respectively. Safety electrodes 110 and 110', to which safety separators 116 and 116' are added, respectively, are located at the outermost sides of the first bi-cells 100 and 100', i.e. the outermost sides of the electrode assembly 300.

The first bi-cell 100 is configured to have a structure in which the safety electrode 110, a separator 120, a double-sided negative electrode 130, a separator 140, and a double-sided positive electrode 150 are sequentially stacked. The second bi-cells 200c and 200c', each of which is a C-type bi-cells configured to have a structure in which a double-sided negative electrode 203c, a separator 204c, a double-sided positive electrode 202c, a separator 204c', and a double-sided negative electrode 203c' are sequentially stacked, are disposed adjacent to the first bi-cells 100 and 100', respectively. The second bi-cell 200a, which is an A-type bi-cell, is disposed between the C-type bi-cells 200c and 200c'.

An insulative tape 360 for stably maintaining the stacked and folded structure is added to the end of the electrode assembly at which the folding process is ended.

On the other hand, an electrode assembly 400 of FIG. 4 is configured to have a structure in which first bi-cells 100 and 100' and second bi-cells 200c, 200a, and 200c' are stacked. The first bi-cells 100 and 100' are located at the outermost sides, i.e. the upper end and lower end, of the electrode assembly 400, respectively. Safety electrodes 110 and 110', to which safety separators 116 and 116' are added, respectively, are located at the outermost sides of the first bi-cells 100 and 100', i.e. the outermost sides of the electrode assembly 400.

Of the second bi-cells 200c, 200a, and 200c', the second bi-cells 200c and 200c', each of which is a C-type bi-cell, are disposed adjacent to the first bi-cells 100 and 100', respectively. In addition, the second bi-cell 200a, which is an A-type bi-cell, is disposed in the middle of the electrode assembly 400.

Thermally bondable separators 410 are disposed between the first and second bi-cells 100, 200c, 200a, 200c', and 100'. When the first and second bi-cells 100, 200c, 200a, 200c', and 100' are stacked, the thermally bondable separators 410 are thermally bonded so as to provide high adhesion force between the first and second bi-cells 100, 200c, 200a, 200c', and 100'.

As previously described, when a needle-shaped conductor penetrates into the electrode assemblies 300 and 400, the electrode assemblies 300 and 400 according to the present invention exhibit improved safety, attributable to the first electrode and the safety separator of each of the electrode assemblies 300 and 400, which will be described hereinafter in detail with reference to FIG. 5, which shows a state in which a needle-shaped conductor penetrates perpendicularly into a first bi-cell, which is located at one of the outermost sides of each of the electrode assemblies 300 and 400.

Figure 5:
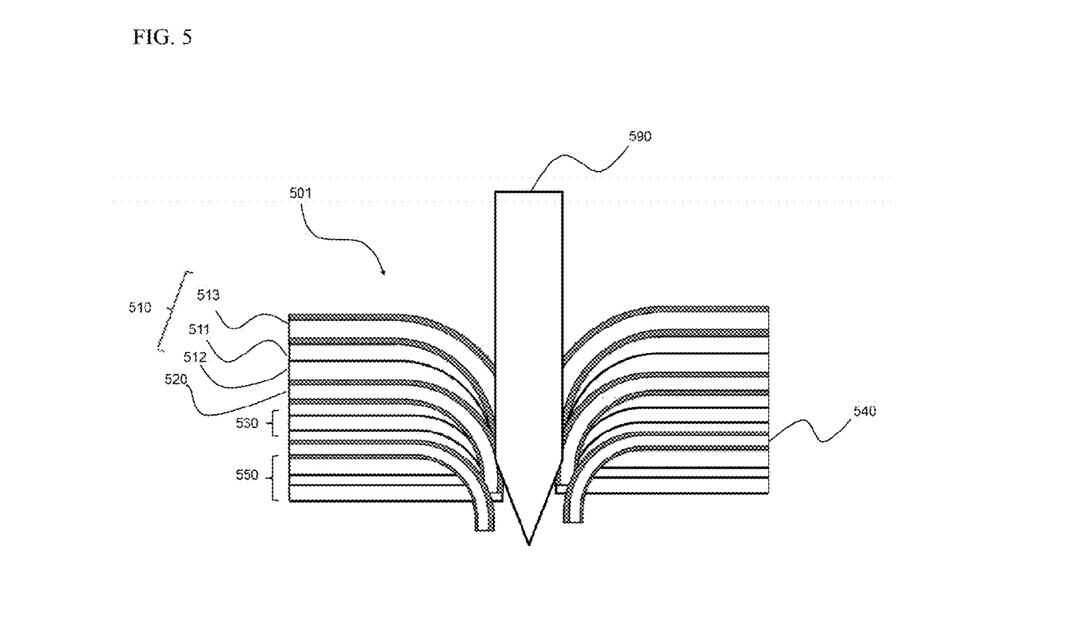
FIG. 5 is a typical view showing a state in which a needle-shaped conductor penetrates into the first bi-cell in the electrode assembly according to the present invention.

Referring to FIG. 5, a needle-shaped conductor 590 sequentially penetrates through a safety electrode 510, a separator 520, a negative electrode 530, a separator 540, and a positive electrode 550 of a first bi-cell 501, which is located at one of the outermost sides of an electrode assembly. At this time, the needle-shaped conductor 590 penetrates through a safety separator 513, and the safety separator 513 is elongated in the direction in which the needle-shaped conductor 590 moves, attributable to the penetration force and frictional force of the needle-shaped conductor 590. As a result, the safety separator 513 contacts the needle-shaped conductor 590 in a state in which the separation film 710 surrounds a current collector 511 and a positive electrode active material layer 512 of the safety electrode 510. Consequently, it is possible for the safety separator 513 to prevent a contact between the needle-shaped conductor 590 and the current collector 511.

In addition, it is possible for the safety separator 513 to prevent a direct contact between the needle-shaped conductor 590 and the negative electrode 530 and between the needle-shaped conductor 590 and the positive electrode 550, thereby improving the safety of the electrode assembly against the needle-shaped conductor, which penetrates into the electrode assembly.

Figure 6:
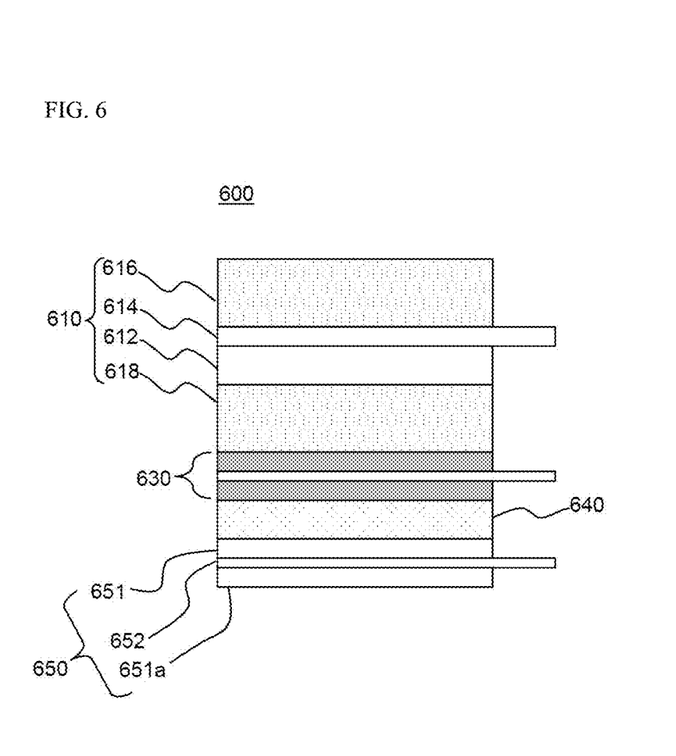
FIG. 6 is a vertical sectional view showing a first bi-cell according to another embodiment of the present invention.

The present invention provides an electrode assembly having a structure different from the structure of the above-described electrode assembly. FIG. 6 is a vertical sectional view showing a first bi-cell according to another embodiment of the present invention.

Referring to FIG. 6, a first bi-cell 600 is configured to have a structure in which a safety separator 616, a safety electrode 610, a safety separator 618, a double-sided negative electrode 630, a separator 640, and a double-sided positive electrode 650 are sequentially stacked.

The safety electrode 610 includes a second surface, to which a positive electrode active material layer is applied, facing the negative electrode 630 and a first surface, to which no positive electrode active material layer is applied. A safety separator 618, which will be hereinafter referred to as a 'second safety separator,' is located on the second surface of the safety electrode 110, and a safety separator 616, which will be hereinafter referred to as a 'first safety separator,' is located on the first surface of the safety electrode 110. The double-sided positive electrode 650 is configured to have a structure in which positive electrode active material layers 651 and 651a are applied to opposite major surfaces of a current collector 652 of the double-sided positive electrode 650. In the same manner, the double-sided negative electrode 630 is configured to have a structure in which negative electrode active materials are applied to opposite major surfaces of a current collector of the double-sided positive electrode 630.

The first safety separator 616 and the second safety separator 618 each have a thickness about 1.5 to 1.7 times greater than the thickness of the separator 640 such that the first safety separator 616 and the second safety separator 618 can be sufficiently elongated when a needle-shaped conductor penetrates into the first bi-cell 600. The separator 640, the first safety separator 616, and the second safety separator 618 each may be an organic/inorganic composite porous SRS separator.

Figure 7:
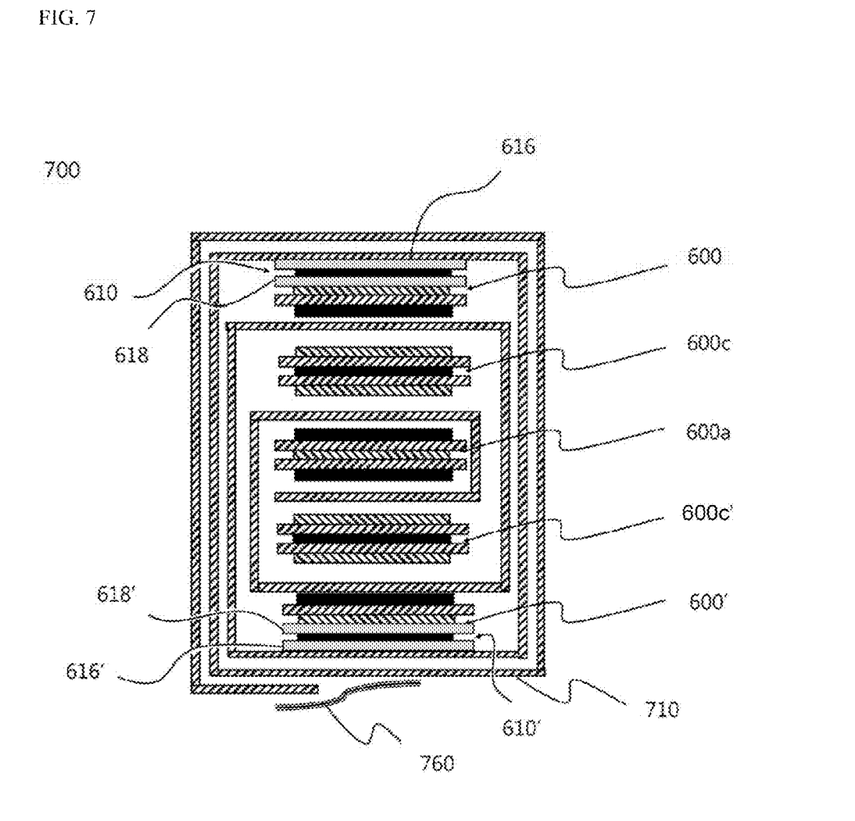
FIG. 7 is a typical view showing an electrode assembly including the first bi-cell shown in FIG. 6.

FIG. 7 is a typical view showing a stacked/folded electrode assembly including first bi-cells and second bi-cells which are shown in FIGS. 1 and 2.

Referring to FIG. 7, an electrode assembly 700 is configured to have a structure in which first bi-cells 600 and 600' and second bi-cells 600c, 600c', and 600a are folded in a state in which the first bi-cells 100 and 100' and the second bi-cells 200c, 200c', and 200a are arranged on a separation film 710 such that the first bi-cells 600 and 600' and the second bi-cells 600c, 600c', and 600a are stacked.

The first bi-cells 600 and 600' are located at the upper end and lower end of the electrode assembly 700, respectively. Safety electrodes 610 and 610', which include first safety separators 616 and 616' and second safety separators 618 and 618', respectively, are located at the outermost sides of the first bi-cells 600 and 600', i.e. the outermost sides of the electrode assembly 700.

The first bi-cell 600 is configured to have a structure in which the safety electrode 610, a double-sided negative electrode 630, a separator 640, and a double-sided positive electrode 650 are sequentially stacked. The second bi-cells 600c and 600c', each of which is a C-type bi-cell configured to have a structure in which a double-sided negative electrode 603c, a separator 604c, a double-sided positive electrode 602c, a separator 604c', and a double-sided negative electrode 603c' are sequentially stacked, are disposed adjacent to the first bi-cells 600 and 600', respectively. The second bi-cell 600a, which is an A-type bi-cell, is disposed between the C-type bi-cells 600c and 600c'.

An insulative tape 760 for stably maintaining the stacked and folded structure is added to the end of the electrode assembly at which the folding process is ended.

Meanwhile, although not shown, a stacked/laminated electrode assembly as shown in FIG. 4 may be constructed using the first bi-cells and the second bi-cells.

As previously described, when a needle-shaped conductor penetrates into the electrode assembly 700, the electrode assembly 700 according to the present invention exhibit improved safety, attributable to the first electrode and the safety separator of the electrode assembly 700, which will be described hereinafter in detail with reference to FIG. 8, which shows a state in which a needle-shaped conductor penetrates perpendicularly into a first bi-cell, which is located at one of the outermost sides of the electrode assembly 700.

Figure 8:
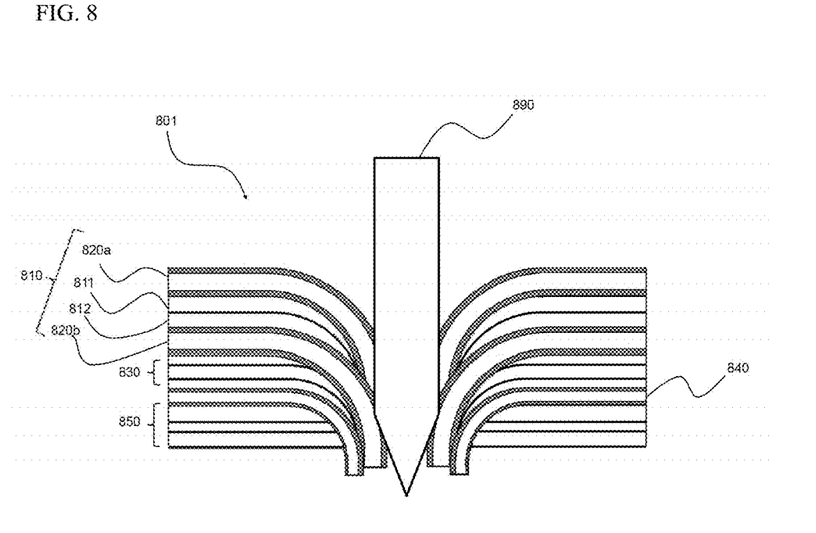
FIG. 8 is a typical view showing a state in which a needle-shaped conductor penetrates into the first bi-cell in the electrode assembly shown in FIG. 6.

Referring to FIG. 8, a needle-shaped conductor 890 sequentially penetrates through a first safety separator 820a, a safety electrode 810, a double-sided negative electrode 830, a separator 840, and a double-sided positive electrode 850 of a first bi-cell 801, which is located at one of the outermost sides of an electrode assembly. At this time, the first safety separator 820a is elongated in the direction in which the needle-shaped conductor 890 moves, attributable to the penetration force and frictional force of the needle-shaped conductor 890. As a result, the first safety separator 820a contacts the needle-shaped conductor 890 in a state in which the separation film 710 surrounds a current collector 811 and a positive electrode active material layer 812 of the safety electrode 810. Consequently, it is possible for the first safety separator 820a to prevent a contact between the needle-shaped conductor 890 and the current collector 811.

In the same manner as the first safety separator 820a, the needle-shaped conductor 890 penetrates through a second safety separator 820b, and the second safety separator 820b is elongated in the direction in which the needle-shaped conductor 890 moves. As a result, the second safety separator 820b contacts the end of the first safety separator 820a and the needle-shaped conductor 890. At this time, the current collector 811 and the positive electrode active material layer 812 of the safety electrode 810 are isolated between the first safety separator 820a and the second safety separator 820b. Consequently, it is possible for the second safety separator 820b to prevent a contact between the current collector 811 of the safety electrode 810 and the double-sided negative electrode 830 and between the positive electrode active material layer 812 of the safety electrode 810 and the double-sided negative electrode 830, thereby preventing the electrode assembly from catching fire due to contact between electrodes having opposite polarities. In addition, it is possible for the second safety separator 820b to prevent a direct contact between the needle-shaped conductor 890 and the double-sided negative electrode 830 and between the needle-shaped conductor 890 and the double-sided positive electrode 850, thereby considerably improving the safety of the electrode assembly against the needle-shaped conductor 890.

Figure 9:
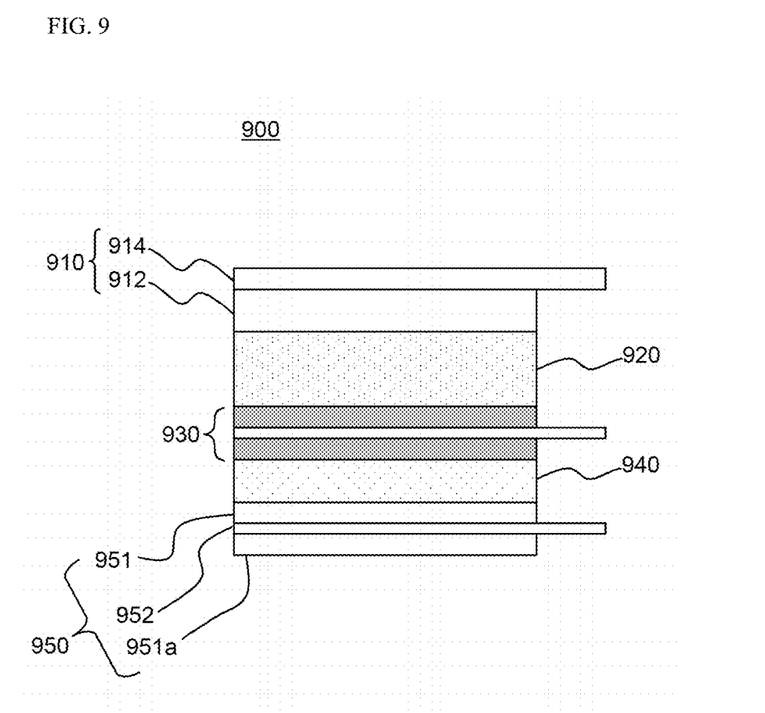
FIG. 9 is a vertical sectional view showing a first bi-cell according to a further embodiment of the present invention.
Figure 10:
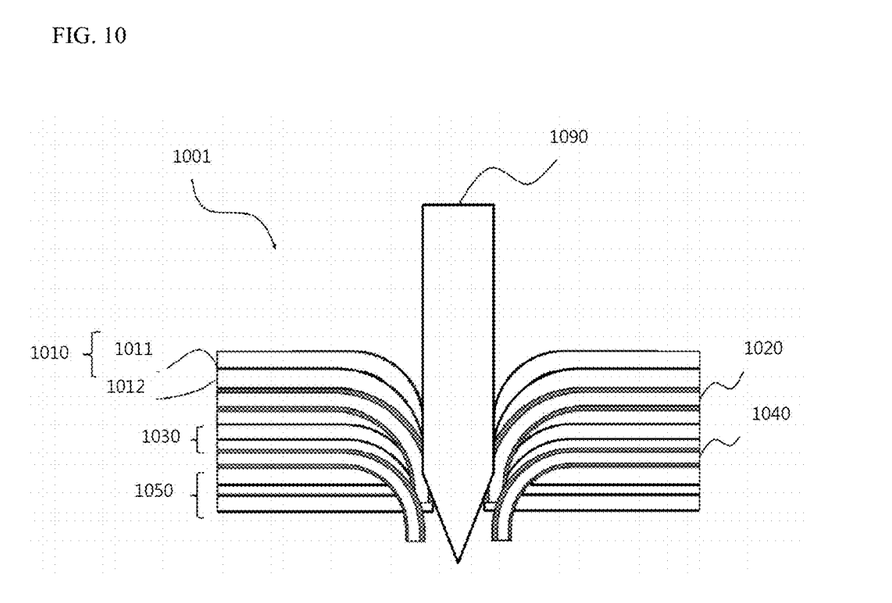
FIG. 10 is a typical view showing a state in which a needle-shaped conductor penetrates into the first bi-cell shown in FIG. 9.

FIG. 9 is a vertical sectional view showing a first bi-cell according to a further embodiment of the present invention, and FIG. 10 is a typical view showing a state in which a needle-shaped conductor penetrates into the first bi-cell shown in FIG. 9.

In the following description, for the convenience of description, a positive electrode is used as a safety electrode, and a unit cell configured to have a structure in which a safety electrode, a safety separator, a negative electrode, a separator, and a positive electrode are sequentially stacked is used as a first bi-cell. However, the present invention is not limited thereto.

Referring first to FIG. 9, a first bi-cell 900 is configured to have a structure in which a safety electrode 910, a safety separator 920, a double-sided negative electrode 930, a separator 940, and a double-sided positive electrode 950 are sequentially stacked.

The safety electrode 910 includes a second surface, configured such that a positive electrode active material layer 912 is applied only to one major surface of a metal current collector 914 facing the double-sided negative electrode 930, and a first surface, to which no positive electrode active material layer 912 is applied.

The double-sided positive electrode 950 is configured to have a structure in which positive electrode active materials 951 and 951a are applied to opposite major surfaces of a current collector 952. In the same manner, the double-sided negative electrode 930 is configured to have a structure in which negative electrode active materials are applied to opposite major surfaces of a current collector.

The safety separator 920 is disposed between the safety electrode 910 and the double-sided negative electrode 930, and the separator 960 is disposed between the double-sided negative electrode 930 and the double-sided positive electrode 950. The safety separator 920 has a thickness about 1.5 to 1.7 times greater than the thickness of the separator 920 such that the safety separator 920 can be sufficiently elongated when a needle-shaped conductor penetrates into the first bi-cell 900. The separator 940 and the safety separator 920 each may be an organic/inorganic composite porous SRS separator.

Hereinafter, a state in which a needle-shaped conductor penetrates perpendicularly into a first bi-cell, which is located at one of the outermost sides of an electrode assembly, will be described in detail with reference to FIG. 10.

Referring to FIG. 10, a needle-shaped conductor 1090 sequentially penetrates through a safety electrode 1010, a safety separator 1020, a double-sided negative electrode 1030, a separator 1040, and a double-sided positive electrode 1050 of a first bi-cell 1001, which is located at one of the outermost sides of the electrode assembly. At this time, the needle-shaped conductor 1090 penetrates through a metal current collector 1011, and the metal current collector 1011 is elongated in the direction in which the needle-shaped conductor 1090 moves, attributable to the penetration force and frictional force of the needle-shaped conductor 1090. As a result, the metal current collector 1011 contacts the needle-shaped conductor 1090. In the same manner, the needle-shaped conductor 1090 also penetrates through the safety separator 1020, which is disposed between the safety electrode 1010 and the double-sided negative electrode 1030, and the safety separator 1020 is elongated in the direction in which the needle-shaped conductor 1090 moves, attributable to the penetration force of the needle-shaped conductor 1090. As a result, the safety separator 1020 separates the metal current collector 1011 and the double-sided negative electrode 1030 from each other. Consequently, it is possible for the safety separator 1020 to prevent a direct contact between the safety electrode 1010 and the double-sided negative electrode 1030, thereby preventing the occurrence of a short circuit in the electrode assembly due to contact between electrodes having opposite polarities. In addition, it is possible for the safety separator 1020 to prevent a direct contact between the needle-shaped conductor 1090 and the double-sided negative electrode 1030 and between the needle-shaped conductor 1090 and the double-sided positive electrode 1050, thereby preventing the occurrence of a short circuit in the electrode assembly.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, an electrode assembly according to the present invention is configured to have a structure in which, in a case in which a needle-shaped conductor penetrates into the electrode assembly, a safety separator of a safety electrode is elongated by friction force between the needle-shaped conductor and the safety separator, whereby it is possible to minimize contact between the needle-shaped conductor and electrodes of the electrode assembly, with the result that it is possible to prevent an excessive amount of current from flowing to the needle-shaped conductor. In addition, the safety separator has a relatively large thickness. In a case in which a heavy object pushes the electrode assembly or strong impact is applied to the electrode assembly, therefore, it is possible for the safety separator to absorb such shocks, thereby further improving the safety of the electrode assembly against external force.

The invention claimed is:

1. An electrode assembly configured to have a structure in which two or more unit cells are sequentially stacked or a structure in which two or more unit cells are folded using a long sheet type separation film, wherein
the unit cells comprise bi-cells, each of which comprises a positive electrode, a negative electrode, and a separator, at least one of the bi-cells comprises a safety electrode configured such that an electrode active material is applied only to one major surface of an electrode current collector, the safety electrode comprises a first surface, to which no electrode active material is applied, and a second surface, to which the electrode active material is applied, and the at least one of the bi-cells comprising the safety electrode is configured such that a safety separator, having a thickness equivalent to 110% to 220% of a thickness of a separator disposed between a positive electrode and a negative electrode or between a negative electrode and a positive electrode excluding the safety electrode, is added to the first surface and/or the second surface of the safety electrode.

2. The electrode assembly according to claim 1, wherein the bi-cells comprise first bi-cells disposed at outermost sides of the electrode assembly and second bi-cells disposed between the first bi-cells.

3. The electrode assembly according to claim 2, wherein each of the first bi-cells is configured to have a structure in which a safety separator, a safety electrode, a separator, a double-sided electrode, a separator, and a double-sided electrode are sequentially stacked.

4. The electrode assembly according to claim 3, wherein the double-sided electrode is configured such that an electrode active material is applied to opposite major surfaces of a current collector.

5. The electrode assembly according to claim 2, wherein each of the first bi-cells is configured to have a structure in which a safety separator, a safety electrode, a safety separator, a double-sided electrode, a separator, and a double-sided electrode are sequentially stacked.

6. The electrode assembly according to claim 2, wherein each of the first bi-cells is configured to have a structure in which a safety electrode, a safety separator, a double-sided electrode, a separator, and a double-sided electrode are sequentially stacked.

7. The electrode assembly according to claim 2, wherein each of the second bi-cell is configured to have the same structure as each of the first bi-cells and/or a structure in which a double-sided electrode, a separator, a double-sided electrode, a separator, and a double-sided electrode are sequentially stacked.

8. The electrode assembly according to claim 1, wherein the safety electrode is disposed on at least one outermost side of the electrode assembly.

9. The electrode assembly according to claim 1, wherein the separator and the safety separator each are an organic/inorganic composite porous safety-reinforcing separator (SRS).

10. The electrode assembly according to claim 9, wherein the SRS separator is configured such that an active layer, comprising inorganic particles and a binder polymer, is coated on a polyolefin-based separator substrate.

11. The electrode assembly according to claim 10, wherein a thickness ratio of the separator substrate to the active layer is 9:1 to 1:9.

12. The electrode assembly according to claim 11, wherein the thickness ratio of the separator substrate to the active layer is 5:5.

13. The electrode assembly according to claim 10, wherein the inorganic particles are one or more kinds of inorganic particles selected from a group consisting of (a) inorganic particles having piezoelectricity and (b) inorganic particles having lithium ion transfer ability.

14. The electrode assembly according to claim 13, wherein the inorganic particles having piezoelectricity are one or more kinds of inorganic particles selected from a group consisting of $BaTiO_3$, $Pb(Zr,Ti)O_3$ (PZT), $Pb_{1-x}La_xZr_{1-y}Ti_yO_3$ (PLZT), $Pb(Mg_{3}Nb_{2/3})O_3$—$PbTiO_3$ (PMN-PT), and hafnia ($HfO_2$).

15. The electrode assembly according to claim 13, wherein the inorganic particles having lithium ion transfer ability are one or more kinds of inorganic particles selected from a group consisting of lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z$ (PO$_4$)$_3$, where 0<x<2, 0<y<1, and 0<z<3), (LiAlTiP)$_x$O$_y$-based glass (where 0<x<4 and 0<y<13), lithium lanthanum titanate (Li$_x$La$_y$TiO$_3$, where 0<x<2 and 0<y<3), lithium germanium thio phosphate (Li$_x$Ge$_y$P$_z$S$_w$, where 0<x<4, 0<y<1, 0<z<1, and 0<w<5), lithium nitride (Li$_x$N$_y$, where 0<x<4 and 0<y<2), SiS$_2$-based glass (Li$_x$Si$_y$S$_z$, where 0<x<3, 0<y<2, and 0<z<4), and P$_2$S$_5$-based glass (Li$_x$P$_y$S$_z$, where 0<x<3, 0<y<3, and 0<z<7).

16. The electrode assembly according to claim 1, wherein the separator has a thickness of 10 to 14 micrometers.

17. The electrode assembly according to claim 1, wherein the safety separator added to the second surface has a thickness of 15 to 30 micrometers.

18. The electrode assembly according to claim 17, wherein the safety separator added to the second surface has a thickness of 20 micrometers.

19. The electrode assembly according to claim 1, wherein the safety separator added to the first surface has a thickness equivalent to 80 to 95% of a thickness of the safety separator added to the second surface.

20. A secondary battery having an electrode assembly according to claim 1 mounted in a battery case.

21. The secondary battery according to claim 20, wherein the battery case is a pouch-shaped case made of an aluminum laminate sheet or a metal can-shaped case.

22. A battery pack comprising a secondary battery according to claim 20 as a unit battery.

23. A device comprising a battery pack according to claim 22 as a power source.

24. The device according to claim 23, wherein the device is selected from among a mobile phone, a portable computer, a smartphone, a smart pad, a tablet PC, and a netbook computer.

* * * * *